Figure 1:
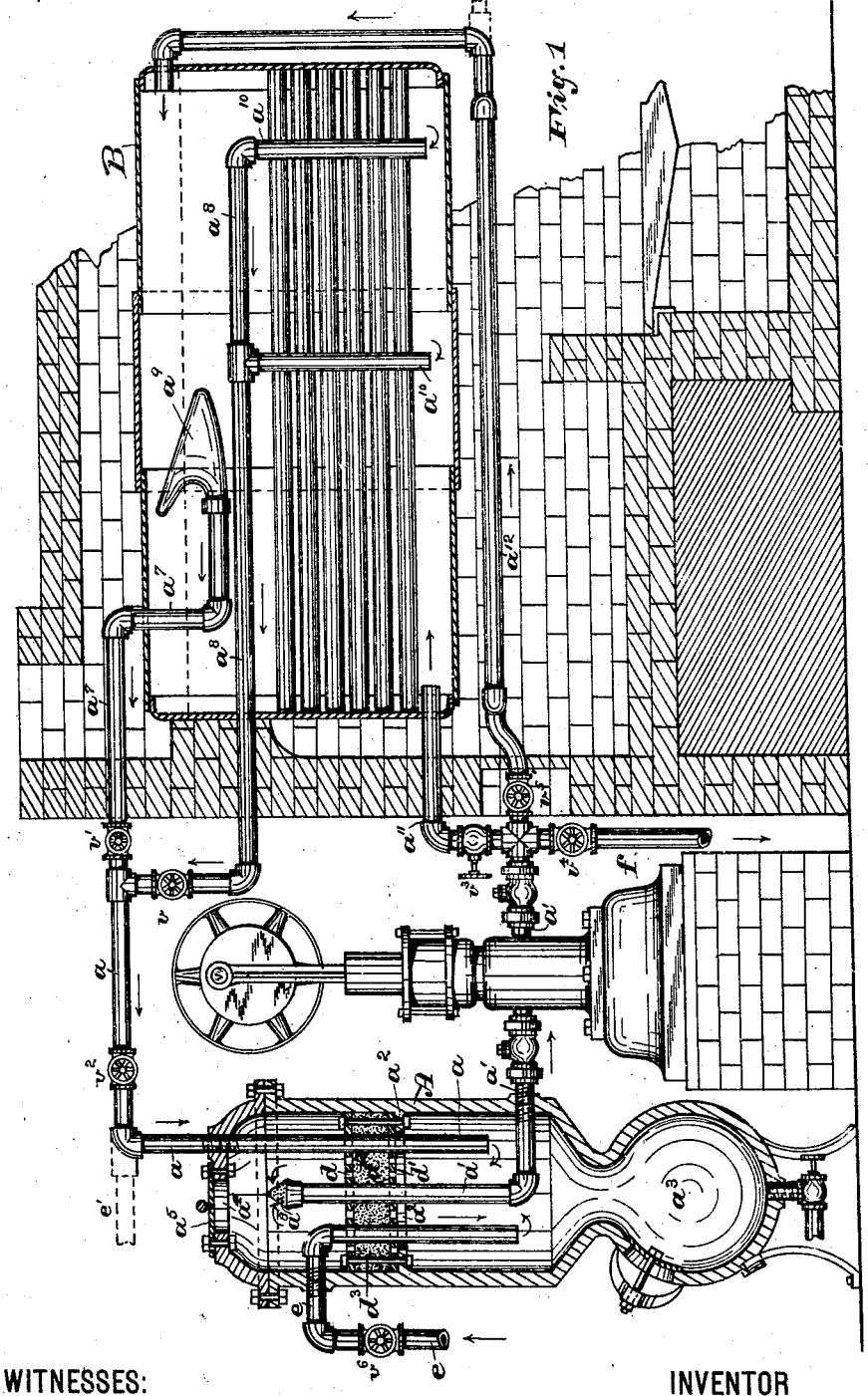

(No Model.) 2 Sheets—Sheet 2.
A. H. CROCKFORD
WATER HEATER AND PURIFIER.
No. 373,647. Patented Nov. 22, 1887.
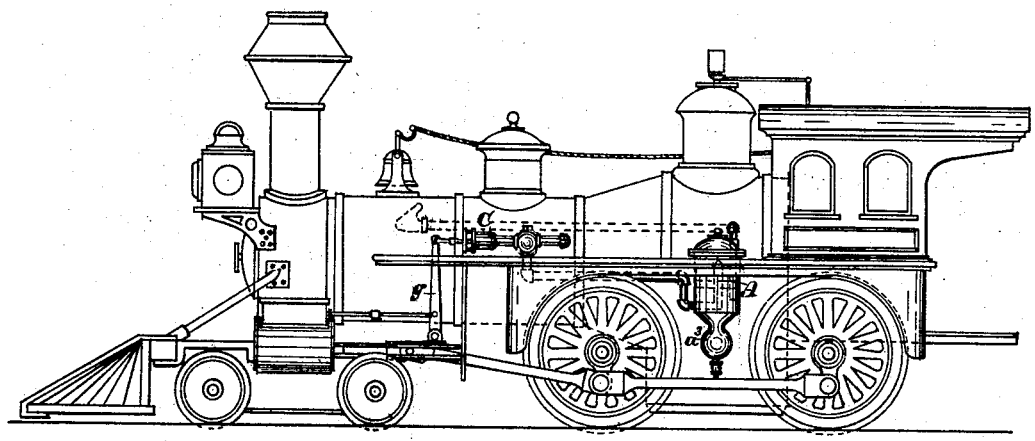
Fig. 2
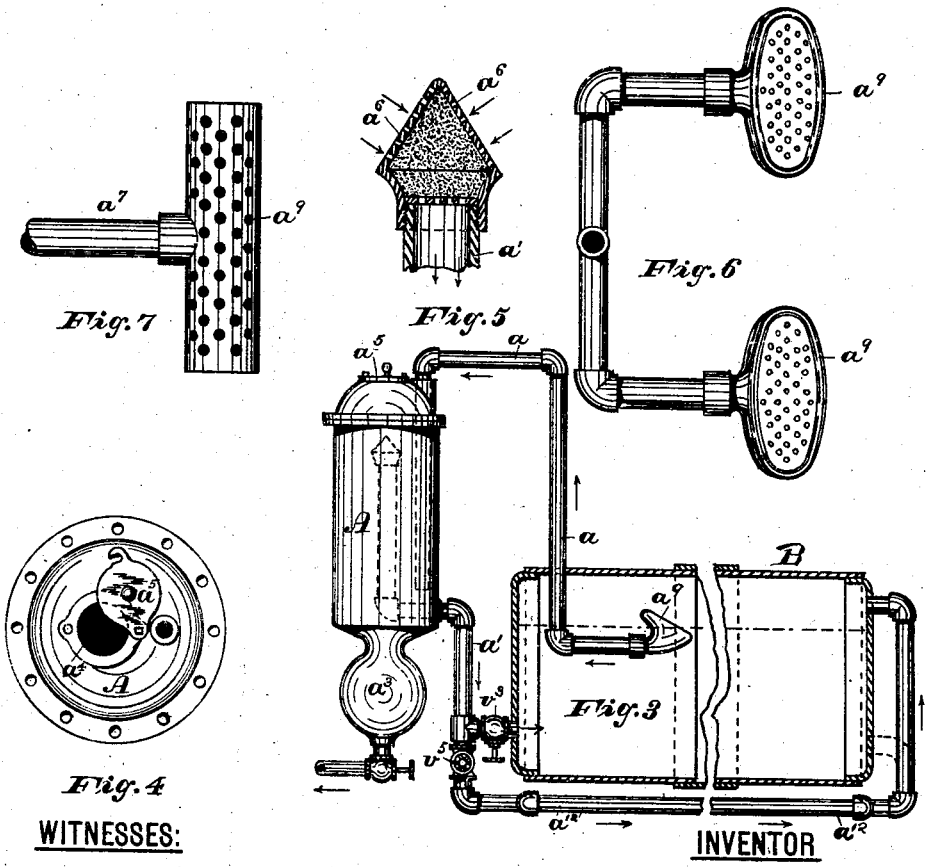
WITNESSES:
George B. Adams
F. J. Schulmerich
INVENTOR
Alfred H. Crockford
BY Campbell ATT'YS.

UNITED STATES PATENT OFFICE.

ALFRED H. CROCKFORD, OF HARRISON, NEW JERSEY.

WATER HEATER AND PURIFIER.

SPECIFICATION forming part of Letters Patent No. 373,647, dated November 22, 1887.

Application filed March 28, 1887. Serial No. 232,662. (No model.)

*To all whom it may concern:*

Be it known that I, ALFRED H. CROCKFORD, a citizen of the United States, residing at Harrison, in the county of Hudson and State of New Jersey, have invented certain new and useful Improvements in Water Heaters and Purifiers and Boiler-Cleaners; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The purpose of this invention is to provide a system of water-purification whereby the organic and inorganic matter held in solution in the water may be removed, leaving the water free from any impurities that tend to render the same unfit for either manufacturing or domestic uses.

One of the uses to which my improved system and apparatus is intended to be applied is that of a combined water heater and purifier and a boiler-cleaner, which is illustrated in the accompanying drawings, in which—

Figure 1 is a sectional view of my improved apparatus, showing the relation thereof to a stationary boiler. Fig. 2 is a side elevation of a locomotive having the cleaning and purifying attachment arranged thereon. Fig. 3 is a view illustrating a particular arrangement of my apparatus attached to a boiler. Fig. 4 is a top view of the water-tank. Fig. 5 is a sectional view of a filtering arrangement on the end of a pipe within the tank. Figs. 6 and 7 are plan views of skimmers adapted to be used in my system.

In said views similar letters of reference are used to indicate corresponding parts.

A in the above-described views indicates the tank in which the soluble matter in the water is separated therefrom and the water purified, and also in which the feed-water is heated when the apparatus is used as a combined water-heater and boiler-cleaner, and B is the boiler, with which said tank is adapted to be connected by suitable pipes. Extending from said tank are pipes $a$ $a'$, through which the water passes to and from the tank and boiler, the pipe $a$, which conducts the water from the boiler to the tank, entering the top of said tank and extending down within the same to or toward the bottom thereof, as shown in Fig. 1, while the pipe $a'$, through which the water flows from the tank to the boiler, enters or opens into the tank, so as to draw off the water from the top of the water-column therein.

The pipe $a'$, as indicated in Fig. 1, is arranged within the tank, extending from the top of the interior thereof down through the same and out through the side, whereby the water is drawn from the top of the water-column, and in passing down through said pipe the temperature of the water is increased, as the lower end of the pipe $a'$ comes in direct contact and is immersed in the hot water and steam, which is conducted directly from the boiler by the pipe $a$ down into the bottom of the tank and rises up within the same, as indicated by the arrows in Fig. 1.

In either of the pipes connecting the boiler and tank is arranged a pump, C, which provides a positive means for causing and maintaining the flow of the water to and from the tank and boiler, and also enabling the tank to be placed in any desired position or at any distance in relation to the boiler without affecting the circulation of the water. Furthermore, when the water is purified in the tank by filtration, the pump acts more powerfully to draw the water through the filtering material, and thus greatly facilitates the cleaning and purification of the water, and also when the apparatus is used for domestic or for other purposes—as for drinking-water—the pump readily forces the water from the tank to the height or place desired.

Within the tank is arranged a filter, which, as illustrated in the drawings, consists of two perforated plates, $d$ $d'$, between which the filtering material, $d^3$, is placed, the lower plate resting on a ring, $a^2$, cast on or secured to the walls of the tank, and to said ring the filter is secured by bolts $d^2$, or in any suitable manner. The pipes $a$ and $a'$ extend through said filter, so that it does not interfere with the normal purpose of such arrangement, and when the feed-water is forced or injected into the tank instead of into the boiler or into the pipe leading from the boiler to the tank, as dotted at $e'$, Fig. 1, the feed-pipe $e$ also extends down through the filter when the said pipe enters the top of the tank, as indicated. Thus, the dirty water from the boiler and feed is thrown into the bottom of the tank beneath the filter.

When the tank is intended to be used as a simple boiler-cleaner, removing the soluble matter in the water by the gravitation or precipitation of the same down into the silt-receptacle $a^3$ and drawing off the clear water from the top of the water-column, the feed-water pipe $e$ is omitted and the feed-water injected into the boiler in the usual manner; but when the apparatus is designed to act as a water-heater in addition to its function as a silt-separator or boiler-cleaner the feed-water is injected into the bottom of the tank, preferably through a pipe leading down within the same, thus throwing the dirty water down into the bottom of said tank and permitting the sediment therein to gravitate into the receptacle $a^3$, similar to the method of introducing the water from the boiler, the soluble matter in both cases having an opportunity to settle within the tank, as the return current to the boiler is taken from the top of the water-column in the tank.

In the top of the tank is an opening, $a^4$, closed by a cover, $a^5$, which may be pivotally secured to the top of the tank, as illustrated in Fig. 4, or said cover may be screwed or otherwise secured upon the top of said tank. Through said opening soda or other substance adapted to purify the water may be inserted into the tank.

Instead of inserting a filter in the tank, extending from side to side thereof, a strainer, $a^6$, may be arranged upon the end of the pipe $a'$, as in Figs. 1 and 5, and may be filled with filtering material, as indicated, or both of said filtering devices may be used together.

The pipe $a$, which conducts the water from the boiler to the tank, is connected with two pipes, $a^7$ and $a^8$, one of which, $a^7$, is provided with a broadened end or skimmer, $a^9$, which is formed as shown in Figs. 1 and 6 or as in Fig. 7, and is placed in the boiler on the water-line to take the scum and foreign matter which rises to and floats on the surface of the water. The pipe $a^8$ communicates with said pipe $a$ outside of the boiler, and is provided with one or more pipes, $a^{10}$, projecting downwardly therefrom toward the bottom of the boiler, as indicated in Fig. 1. The pipe $a^7$ conveys the water at the water-line into the pipe $a$, and thence into the tank, while the pipes $a^8 a^{10}$ conduct the water from the bottom of the boiler into said pipe $a$ and the tank. Thus the water from every part of the boiler is drawn into the tank, and any settling or accumulation of the sediment on the boiler-sheets is prevented. Valves $v v'$ are provided in the pipes $a^7$ and $a^8$ to control the current of water flowing from the boiler to the tank, being allowed to pass through either of the pipes $a^7$ or $a^8$, or both.

As illustrated in Fig. 1, the pipe $a'$ is connected with the pump, and extending beyond the same into the bottom of the rear of the boiler is a pipe, $a^{11}$, while the pipe $a^{12}$, which connects with said pipe $a'$ and the pump, extends beneath the boiler in a coil and enters the front of the boiler, preferably at the top. In said pipes $a^{11}$ and $a^{12}$ are valves $v^3$ and $v^5$, which control the admission of the water from the tank to the boiler through said pipes. When the water is allowed to flow through the coil $a^{12}$, it passes through the fire, and, being rapidly turned into steam, accelerates the flow of the current and assists the pump in causing the circulation of the water. This arrangement of the pipe leading from the tank to the boiler is of special advantage when used as indicated in Fig. 3, the pump being dispensed with in this case. When thus constructed, the tank is placed preferably above the boiler or the water-line therein, and the gravity of the water in the tank, assisted by the steam generated in the boiler, causes a displacement of the water and results in a current passing from the boiler to the tank and back from the tank to the boiler, as indicated by the arrows in Fig. 3. The pipes leading from the tank to the boiler when thus arranged may also enter the rear of the boiler, as indicated in Fig. 3, and in said pipes valves $v^3 v^5$ are provided to control the direction of the flow of the currents of water.

Another arrangement of the tank with the coil beneath the boiler may be used, in which the tank is placed at the rear of and below or on a line with the boiler and the pipe $a$, which conducts the water from the boiler to the tank, connected with the rear of the boiler at the bottom, while the pipe $a'$, through which the water flows from the tank to the boiler, extends beneath the boiler in a coil and enters the front of the boiler at the top, as indicated in Figs. 1 and 3. In this arrangement the gravity of the water in the boiler assists the circulation of the water to and from the boiler and tank, acting in conjunction with the steam generated in the coil extending over the fire.

As indicated in Fig. 1, a pipe, $f$, is arranged to communicate with the pipe $a'$ between the pump and the boiler, and through said pipe $f$ the purified water from the tank is pumped to any desired place or reservoir for drinking or other purposes. When thus used, the flow of the water from the boiler to the tank and from the tank to the boiler is cut off by closing the valves $v^2$ and $v^3$ and $v^4$, and the cold feed-water is drawn from the tank into the pipe $f$.

In Fig. 2 is illustrated an arrangement of my improved apparatus on a locomotive, in which the same arrangements of the pipes as hereinbefore described in relation to a stationary boiler may be used. The pump preferably used in this relation is a horizontal pump, which is worked from the valve-rod of the engine through a lever, $g$, or in any other suitable manner.

The specific constructions illustrated and described in this application not specifically claimed herein are reserved for future applications, and my rights therein are not dedicated to the public.

Having thus described my invention, what I claim is—

1. In a water heater and purifier and boiler-cleaner, the combination of a water tank or receptacle, a pipe entering said tank and extending down within the same to or toward the bottom thereof, and adapted to be connected with a boiler to conduct the water therefrom into the bottom of the tank, and a pipe opening into the top of the interior of said tank and extending down within said tank and out therefrom, and adapted to be connected with a boiler to conduct the water from the top of the water-column in said tank into said boiler, for the purposes set forth.

2. In a water heater and purifier and boiler-cleaner, the combination of a boiler, a water tank or receptacle, a pipe connected with said boiler and entering said tank and extending down within the same to or toward the bottom thereof, through which the water from the boiler is conducted into the bottom of the tank, a pipe opening into the top of the interior of said tank and extending down within the same and out therefrom to the boiler, through which the water from the top of the water-column in the tank is conducted into the boiler, and a pump arranged in the pipe-connections between the tank and boiler and constructed and arranged to draw the water from the tank and throw the same into the boiler, for the purposes set forth.

3. In a water-purifier, the combination of a water tank or receptacle, a feed-pipe entering said tank and extending down within the same to or toward the bottom thereof, a pipe opening into the top of the interior of said tank and extending out therefrom, and a pump connected with said pipe to draw the water from the top of the water-column in said tank, for the purposes set forth.

4. In a water-purifier, the combination of a water tank or receptacle, a filter arranged in said tank, dividing the same into compartments, a feed-pipe entering said tank and extending down within the same through and beneath said filter to or toward the bottom of said tank, a pipe opening into the top of the interior of said tank above the filter therein and extending down within said tank through the filter and out from the tank, and a pump connected with said pipe to draw the water from the interior of said tank above the filter, for the purposes set forth.

5. In a water heater and purifier and boiler-cleaner, the combination of a boiler, a water-tank, a pipe connected with said boiler and entering into and extending down within said tank to or toward the bottom thereof, a pipe opening into the top of the interior of said tank and extending down within the same and passing therefrom underneath the boiler, and connected with the boiler at the front thereof, for the purposes set forth.

6. In a water heater and purifier and boiler-cleaner, the combination of a boiler, a water tank or receptacle, a pipe, $a$, provided with pipes $a^7$ $a^8$, arranged within the boiler, substantially as set forth, said pipe $a$ entering the water-tank and extending down within the same to or toward the bottom thereof, a pipe, $a'$, opening into the top of the interior of said tank and connected with said boiler, a pump arranged in said pipe $a'$ between the tank and the boiler, and a pipe, $f$, communicating with said pipe $a'$ between the pump and the boiler, said pipes $f$ and $a'$ being provided with suitable valves, for the purposes set forth.

7. In a water heater and purifier and boiler-cleaner, the combination of a water tank or receptacle having an opening, $a^4$, in the top thereof provided with a cover, $a^5$, a pipe from the boiler entering said tank and extending down within the same to or toward the bottom thereof, a pipe opening into the top of the interior of said tank and extending down within the same and out therefrom to the boiler, and a cold-water feed pipe entering said tank and extending down within the same, for the purposes set forth.

8. In a water heater and purifier and boiler-cleaner, the combination of a boiler, a water tank or receptacle, a pipe connected with said boiler and entering said tank and extending down within the same to or toward the bottom thereof, through which the water is conducted from the boiler to the tank, a pipe opening into the top of the interior of said tank and connected with the boiler, through which the water is conducted from the tank to the boiler, a pump arranged in said pipe which conducts the water from the tank to the boiler between said tank and boiler, and a pipe, $f$, connecting with said pipe between the pump and the boiler, each of which pipes is provided with a valve therein, substantially as and for the purposes set forth.

9. In a water heater, purifier, and boiler-cleaner, the combination of a boiler, a water tank or receptacle, a pipe connected with said boiler and entering said tank and extending down within the same to or toward the bottom thereof, through which the water from the boiler is conducted to the bottom of the tank, a pipe opening into the top of the interior of said tank and extending out therefrom to the boiler, through which the water from the top of the water-column in the tank is conducted into the boiler, and a pump arranged directly in the pipe-connections between the tank and boiler, constructed and arranged to draw the water directly from the tank and throw the same directly into the boiler, for the purposes set forth.

10. In a water-purifier and boiler-cleaner, the combination of a boiler, a water tank or receptacle, a pipe connected with said boiler and entering into and extending down within said tank to or toward the bottom thereof, a pipe opening into the top of the interior of said tank and, passing therefrom, extending
5 beneath the boiler and connected with said boiler at the front thereof above or at the water-line, for the purposes set forth.

In testimony that I claim the invention set forth above I have hereunto set my hand this 26th day of March, 1887.

ALFRED H. CROCKFORD.

Witnesses:
FREDK. F. CAMPBELL,
A. SUCH.